US008081641B2

(12) United States Patent
Katabi et al.

(10) Patent No.: US 8,081,641 B2
(45) Date of Patent: Dec. 20, 2011

(54) METHODS AND APPARATUS FOR NETWORK CODING

(75) Inventors: Dina Katabi, Cambridge, MA (US); Hariharan Rahul, Cambridge, MA (US); Sachin Katti, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 979 days.

(21) Appl. No.: 11/529,561

(22) Filed: Sep. 27, 2006

(65) Prior Publication Data

US 2008/0075080 A1   Mar. 27, 2008

(51) Int. Cl.
*H04L 12/28* (2006.01)

(52) U.S. Cl. .................... 370/400; 370/392; 370/338

(58) Field of Classification Search .................. 370/388, 370/389, 400, 392, 338, 315, 310, 328, 474; 709/230

See application file for complete search history.

(56) References Cited

U.S. PATENT DOCUMENTS

| | | | | |
|---|---|---|---|---|
| 5,832,215 | A * | 11/1998 | Kato et al. .................... | 709/230 |
| 7,027,773 | B1 | 4/2006 | McMillin | |
| 7,100,195 | B1 * | 8/2006 | Underwood ..................... | 726/2 |
| 2004/0143672 | A1 | 7/2004 | Padmanabham et al. | |
| 2005/0108368 | A1 * | 5/2005 | Mohan et al. ................. | 709/220 |
| 2005/0198187 | A1 | 9/2005 | Tierney et al. | |
| 2007/0086485 | A1 * | 4/2007 | Vega-Garcia et al. ........ | 370/468 |
| 2007/0274324 | A1 * | 11/2007 | Wu et al. ........................ | 370/400 |
| 2008/0030513 | A1 * | 2/2008 | Jiao et al. ...................... | 345/530 |

FOREIGN PATENT DOCUMENTS

EP    1372306 A    12/2003

OTHER PUBLICATIONS

Katti, Sachin et al., "The Importance of Being Opportunistic: Practical Network Coding for Wireless Environments," pp. 1-10.
Katti, Sachin et al., "XORs in the Air: Practical Wireless Network Coding," SIGCOMM '06, Sep. 11-15, 2006, pp. 243-254.
Chou et al., "Practical Network Coding," *41st Allerton Conf. Communication, On Communication, Control and Computing*, Oct. 2003, pp. 40-49.
Ho et al, "Online Incremental Network Coding for Multiple Unicasts," *DIMACS Working Group on Network Coding*, Jan. 2005, pp. 1-14.

(Continued)

*Primary Examiner* — Dang Ton
*Assistant Examiner* — Mandish Randhawa
(74) *Attorney, Agent, or Firm* — Chapin IP Law, LLC; David W. Rouille, Esq.

(57) ABSTRACT

One embodiment is directed to transmitting encoded data over a broadcast medium to improve network throughput. A sending node may identify a first packet to be transmitted to a first network node and a second packet to be transmitted to a second network node. The sending node may determine whether the first network node stores the second packet and whether the second network node stores the first packet. If the sending node determines that the first network node stores the second packet and the second network node stores the first packet, it may code together the first and second packets to generate an encoded packet and may transmit the encoded packet over the broadcast medium. Thus, the first packet may be transmitted to the first network node and the second packet may be transmitted to the second node in a single transmission.

93 Claims, 6 Drawing Sheets

OTHER PUBLICATIONS

Ho et al., "The Benefits of Coding Over Routing in a Randomized Setting," *International Symposium on Information Theory (ISIT)*, Jun. 2003, p. 442.

Ho et al., "The Utility of Network Coding in Dynamic Environments," *International Workshop on Wireless Ad-Hoc Networks (IWWAN)*, May 2004, pp. 196-200.

Jaggi et al., "Polynomial Time Algorithms for Multicast Network Code Construction," *IEEE Transactions on Information Theory*, vol. 51, No. 6, Jun. 2005, pp. 1973-1982.

Koetter et al., "An Algebraic Approach to Network Coding," *IEEE/ACM Transactions on Networking*, vol. 11, No. 5, Oct. 2003, pp. 782-795.

Lun et al., "Efficient Operation of wireless Packet Networks Using Network Coding," *International Workshop on Convergent Technologies (IWCT)*, 2005, pp. 1-5.

Lun et al., "Further Results on Coding for Reliable Communication Over Packet Networks," *IEEE International Symposium on Information Theory (ISIT 05)*, 2005, 5 pages.

Lun et al., "Achieving Minimum-Cost Multicast: A Decentralized Approach Based on Network Coding," *IEEE Infocom*, 2005, pp. 1608-1617.

Wu et al., "Information Exchange in Wireless Networks with Network Coding and Physical-Layer Broadcast," *MSR-TR-2004-78*, Aug. 2004, 7 pages.

Wu et al., "Distributed Utility Maximization for Network Coding Based Multicasting: A Shortest Path Approach," *IEEE Infocom*, vol. 24, No. 8, Aug. 2006, pp. 1475-1488.

\* cited by examiner

| Destinations |  |  |
|---|---|---|
| Number Encoded |  |  |
| Packet ID | | Intended Destination |
| ⋮ | | |

401

403

| Reception Reports | | |
|---|---|---|
| Number of Reports | | |
| Source | Last Packet | Bitmap |
| ⋮ | | |

405

| Acknowledgements | | |
|---|---|---|
| Number of Acknowledgements | | |
| Local Packet Sequence Number | | |
| Neighbor | Last Acknowledgement | Map |
| ⋮ | | |

FIG. 6

METHODS AND APPARATUS FOR NETWORK CODING

GOVERNMENT GRANT

This invention was made with government support under grant number ANI0335256 awarded by the National Science Foundation. The government has certain rights in this invention

STATEMENT REGARDING FEDERALLY SPONSORED RESEARCH OR DEVELOPMENT

Some of the research relating to the subject matter disclosed herein was sponsored by the following government grants, and the government has certain rights to some disclosed subject matter: NSF-ANI-0335256.

FIELD OF THE DISCLOSURE

The present invention relates to network coding.

DESCRIPTION OF THE RELATED ART

Network coding is a technique for increasing throughput in a computer network, wherein multiple packets are coded together into a single packet, which is then sent to multiple destinations. Each destination has enough information to decode the packet and obtain the native packet intended for it. A simple example is shown in FIG. 1.

Figure 1:
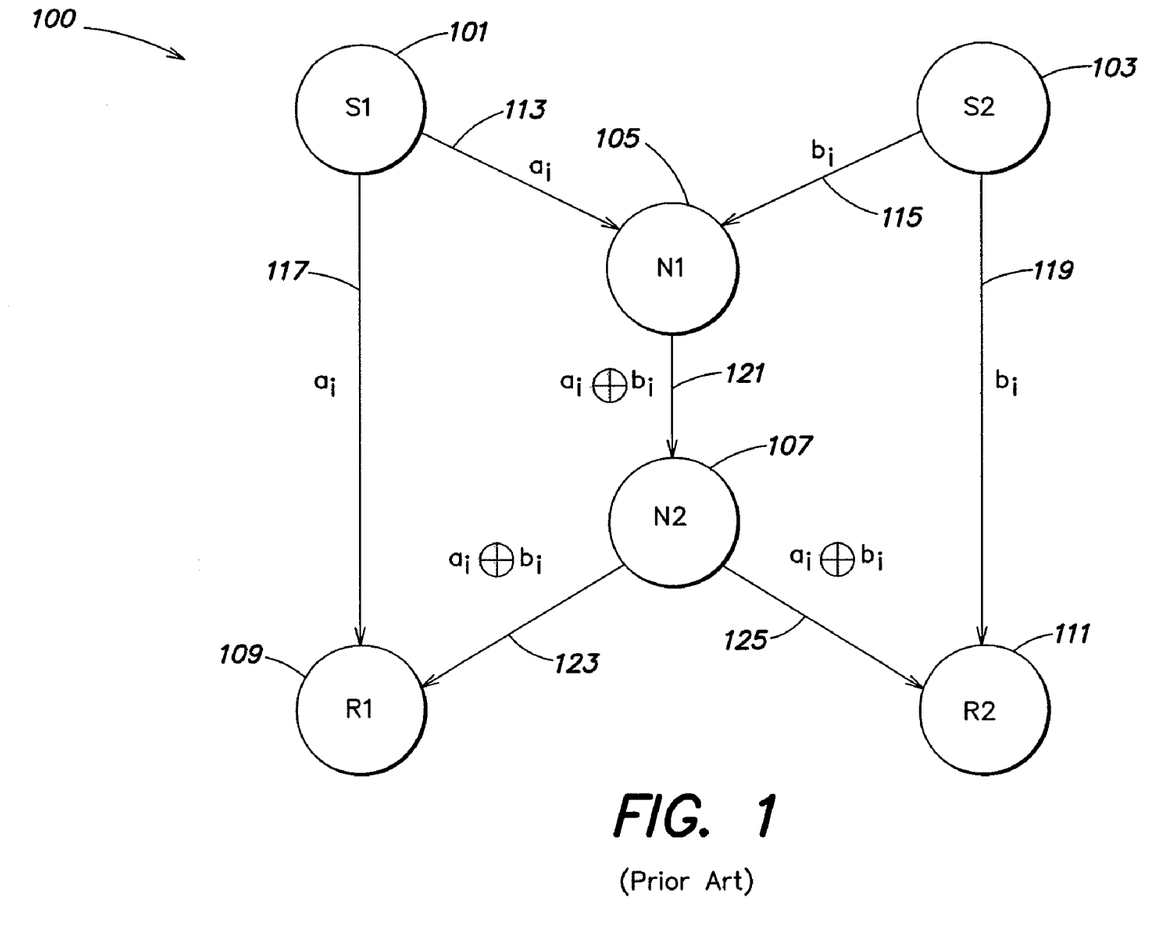
FIG. 1 is a diagram of a prior art network that employs network coding.

FIG. 1 shows a network 100 that includes source nodes 101 and 103 (S1 and S2), intermediate nodes 105 and 107 (N1 and N2), and receiver nodes 109 and 111 (R1 and R2). Each node may be a computer or other network device such as, for example, a router or switch. Node 101 can transmit to nodes 105 and 109 via links 113 and 117, respectively; node 103 can transmit to nodes 105 and 111 via links 115 and 119, respectively; node 105 can transmit to node 107 via link 121; and node 107 can transmit to nodes 109 and 111 via links 123 and 125, respectively.

In the network 100, each link has a capacity of one packet per unit of time. Operation of the network 100 is explained using an example in which node 101 wants to send packet $a_i$ to both nodes 109 and 111, and node 103 wants to send packet $b_i$ to both nodes 109 and 111. If node 105 only forwards the packets that it receives without any encoding, then link 121 will be a bottleneck. For example, at time T1, node 101 transmits $a_i$ to both nodes 109 and 105 and node 103 transmits $b_i$ to both nodes 111 and 105. At time T2, node 105 transmits $a_i$ to node 107. At time T3, node 105 transmits $b_i$ to node 107 and node 107 transmits $a_i$ to node 111. At time T4, node 107 transmits $b_i$ to node 109. Thus, without network coding, transmitting $a_i$ and $b_i$ to both nodes 109 and 111 requires four time units.

By contrast, when network coding is used, $a_i$ and $b_i$ may be transmitted to nodes 109 and 111 in three time units. Consider another example employing coding in which, as above, at time T1 node 101 transmits $a_i$ to both nodes 109 and 105 and node 103 transmits $b_i$ to both nodes 111 and 105. However, in this example, when node 105 receives $a_i$ and $b_i$, it combines them together into a single packet (e.g., by XORing them). At time T2, node 105 sends the combined packet, $a_i \oplus b_i$, to node 107 (wherein the symbol ⊕ denotes the XOR logic function). At time T3, node 107 sends the combined packet, $a_i \oplus b_i$, to nodes 109 and 111. Now, node 109 has both the combined packet, $a_i \oplus b_i$, and the packet $a_i$, and can determine $b_i$ by XORing the combined packet with $a_i$. Similarly, node 111 has both the combined packet, $a_i \oplus b_i$, and the packet $b_i$, and can determine $a_i$ by XORing the combined packet with $b_i$.

The coding of packets $a_i$ and $b_i$ in the foregoing example increases network throughput, as both these packets are delivered to both nodes 109 and 111 in three time units, rather than the four time units required to deliver these packets without network coding.

SUMMARY

One embodiment is directed to a method of transmitting data from a sending network node over a network comprising a plurality of nodes including the sending node, at least some of the plurality of nodes being coupled by a broadcast medium, wherein the sending network has a queue of messages to be transmitted, the queue including a first message received from a first previous hop and a second message received from a second previous hop. The method comprises acts of: identifying the first message to be transmitted from the sending network node to a first destination node via a first network node; identifying the second message to be transmitted from the sending network node to a second destination node via a second network node, wherein the second network node is not the first previous hop; determining whether the first network node stores the second message; determining whether the second network node stores the first message; when it is determined that the first network node stores the second message and the second network node stores the first message, coding together the first and second messages to generate an encoded message; and transmitting the encoded message over the broadcast medium. A further embodiment is directed to at least one computer readable medium encoded with instructions that, when executed on a computer system, perform the above-described method.

Another embodiment is directed to a sending network node adapted for use in a network comprising a plurality of nodes including the sending node, at least some of the plurality of nodes being coupled by a broadcast medium, wherein the sending network has a queue of messages to be transmitted, the queue including a first message received from a first previous hop and a second message received from a second previous hop. The sending network node comprises: at least one output; and at least one controller, coupled to the output, that: identifies the first message to be transmitted to a first destination node via a first network node; identifies the second message to be transmitted from to a second destination node via a second network node, wherein the second network node is not the first previous hop; determines whether the first network node stores the second message; determines whether the second network node stores the first message; when it is determined that the first network node stores the second message and the second network node stores the first message, codes together the first and second messages to generate an encoded message; and transmits the encoded message, via the output, over the broadcast medium.

Another embodiment is directed to a method of transmitting data in a parallel computer comprising a plurality of processors including a sending processor, at least some of the plurality of processors being coupled by a communication bus. The method comprises acts of: identifying a first message to be transmitted from the sending processor to a first destination processor in the plurality of processors; identifying a second message to be transmitted from the sending processor to a second destination processor in the plurality of processors; determining whether the first destination processor stores the second message; determining whether the second destination processor stores the first message; when it is determined that the first destination processor stores the second message and the second destination processor stores the first message, coding together the first and second messages to generate an encoded message; and transmitting the encoded message over the communication bus.

A further embodiment is directed to a method of processing data at a receiving network node from a sending network node over a network comprising a plurality of nodes including the receiving network node and the sending network node, at least some of the plurality of nodes being coupled by a broadcast medium. The method comprises acts of: receiving, at the receiving network node, a first message from the sending network node, wherein the intended destination of the first message is a node different from the receiving network node, and wherein the first message includes information identifying messages stored by the sending node; using the information determine, at the receiving network node, whether the sending network node stores a second message; when it is determined that the sending network node stores the second message, coding together, at the receiving network node, the second message and a least one message not stored by the sending network node to generate an encoded message; and sending the encoded message to the sending network node.

Another embodiment is directed to a method of processing data at a receiving network node from a sending network node over a network comprising a plurality of nodes including the receiving node and the sending node, at least some of the plurality of nodes being coupled by a broadcast medium. The method comprises acts of: receiving, at the receiving network node, a first message from the sending network node, wherein the intended destination of the first message is a node different from the receiving network node; storing the first message at the receiving network node; receiving, at the receiving network node, an encoded message, wherein the receiving network node is an intended destination of the encoded message; and using the first message to decode the encoded message to obtain a second message.

DETAILED DESCRIPTION

Applicants have appreciated that, while prior art networks employing network coding (such as the network depicted in FIG. 1) may improve network throughput in some situations, these networks suffer from several drawbacks. First, such prior art networks are typically designed for multicast applications (i.e., applications in which each packet transmitted over the network is intended for every destination node). However, most practical applications, such as the Internet, are unicast (i.e., a packet transmitted over the network is intended for only a single destination node).

In addition, in prior art networks, packets that are coded together can only be decoded by the destination node, and not any of the intermediate nodes. This requires the encoding node to determine which packets the ultimate destination nodes will have at the time of receipt of the encoded packet to ensure that the destination nodes will be able to decode the encoded packet. However, because a given destination node may be several hops from the encoding node (i.e., there may be one or more intermediate nodes that receive and forward the packet before the packet is received by the destination node), determining which packets the destination node will have at the time of receipt of the encoded packet may present challenges and may reduce the number of opportunities to code packets together.

Moreover, prior art implementations assume a network with a fixed number of senders and receivers, known and fixed traffic rates, and fixed routing algorithms to determine which packets to code together. These assumptions are ill-suited for certain types of networks, such as wireless mesh networks, in which senders and receivers are not necessarily known prior to transmission and may enter and leave the network regularly. Further, in some networks, such as wireless mesh networks, traffic is usually bursty and the transmission rate is generally unknown in advance.

Some embodiments of the present disclosure address the above-described limitations of the prior art network coding implementations. However, not every embodiment addresses all of these limitations, as some embodiments may address only some of these limitations and some embodiments may not address any of these limitations. Indeed, the present disclosure is not limited to providing a solution to these or any other limitations of the prior art.

One embodiment of the invention is directed to a system in which packets are transmitted from a first node to a second node by broadcasting the packets. The broadcast nature of the transmission allows other nodes that can hear the broadcast, but for whom the packet is not intended to "snoop" the broadcasted packets and temporarily store them. As used herein, a node "snooping" a packet means that the node receives and processes the packet, even though the it is not an intended recipient of the packet. Thus, multiple nodes in the network may have knowledge of which packets some or all of its neighbor nodes have temporarily stored. In this manner, multiple nodes of the network know the native packets that its neighbor nodes have available to decode encoded packets and may use this information to determine which packets to code together and transmit to these nodes.

As used herein, the term "native packet" refers to a packet that has not been encoded. The term "encoded packet" refers to a packet that is the result of coding together two or more packets (e.g., by XORing the packets together). The term "node" refers to any network device, computer, or processor, such as, for example, a router, a switch, a hub, a wireless access point, a server, a client, or any other network device or computer. Further, the term "network" is not limited to a computer network, as any suitable type of network may be used, such as for example, a cellular telephone network (which includes base stations and mobile stations as nodes) or any other type of network.

In one embodiment, the network may be a network of processors in a parallel computer, such as, for example, a massively parallel computer, a shared memory parallel computer, or a Beowulf cluster. In such embodiments, the network nodes may be, for example, processors (such as in a massively parallel computer or a shared memory parallel computer) or independent computers (such as in a Beowulf cluster). The nodes may be coupled by any suitable medium that permits broadcast transmissions to be sent or received. For example, the nodes may be coupled by one or more communication buses (i.e., for interprocessor communication) or one or more network cables.

Additionally, the "neighbor nodes" of a node refer to the nodes with which the node is capable of communicating via broadcast transmission. For example, in a Wi-Fi network, a node's neighbor nodes would be those nodes that are within radio range of the node. The term neighbor node, however, does not imply that a neighbor node is within any particular geographic distance of another node. Rather, more generally, two nodes are neighbor nodes if they are capable of communicating with each other via broadcast transmission over any distance, and without restriction to type of communication medium or media.

Figure 2:
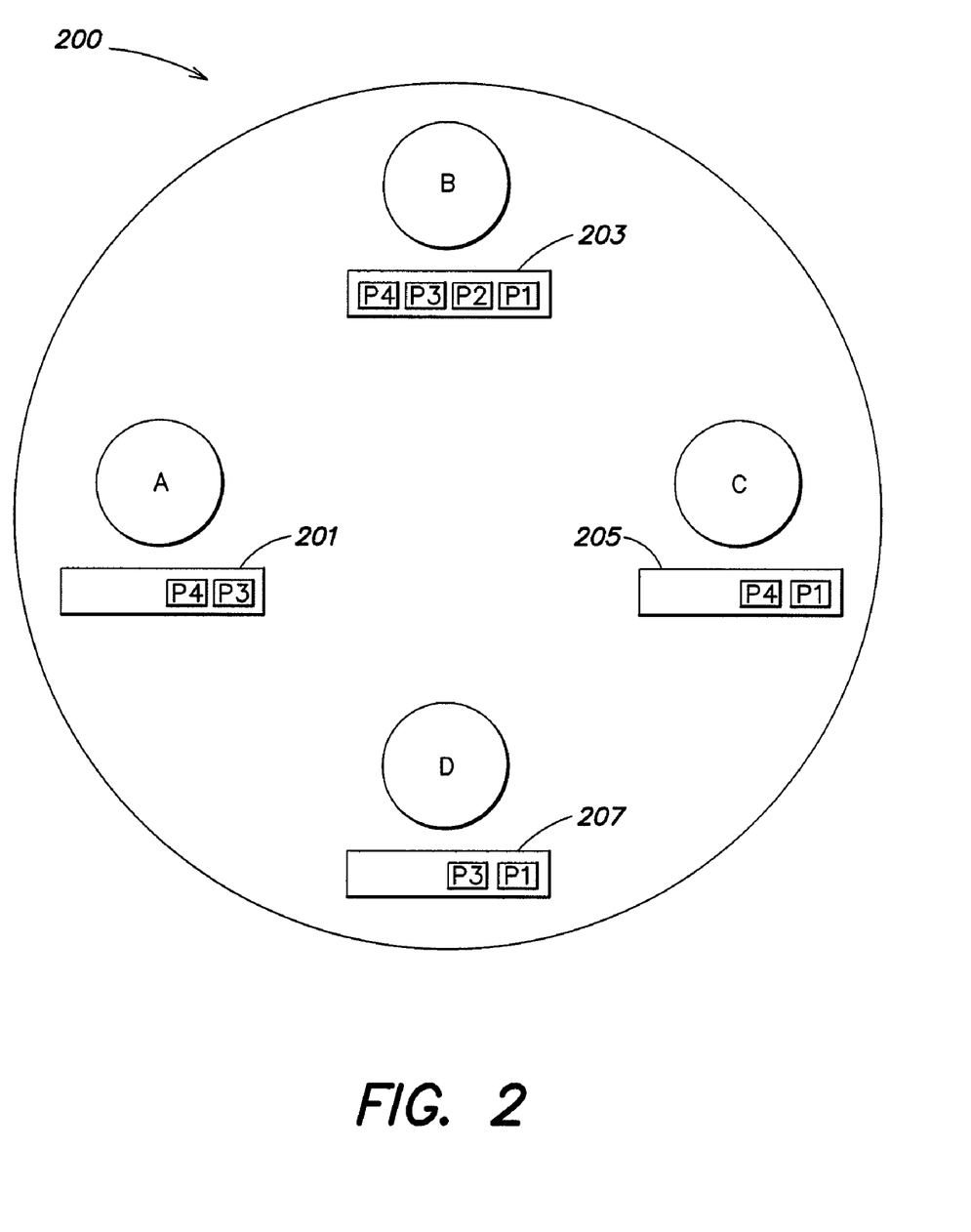
FIG. 2 is a diagram of a network that employs network coding over a broadcast medium, in accordance with one embodiment.

FIG. 2 shows a simple example of a network 200 in which a node may opportunistically code packets using information about which packets its neighbor nodes store, according to one embodiment of the present disclosure. Network 200 includes four nodes: A, B, C, and D, each of which has a packet pool (201, 203, 205, and 207, respectively) that identifies the packets that the node has temporarily stored. Node B's packet pool (i.e., packet pool 203) stores packets P1, P2, P3, and P4, each of which packets is also in node B's output queue, awaiting transmission to its corresponding next hop. In the example of FIG. 2, from node B, P1's next hop is node A, P2's next hop is node C, P3's next hop is node C, and P4's next hop is node D. If node B were to broadcast these packets serially to their respective next hop, it would require four transmissions (i.e., one for each of packets P1, P2, P3, and P4). However, assuming that node B is aware of the packets that each of its neighbor nodes has, node B could encoded packet transmissions using this knowledge to decrease the total number of transmissions required to convey all packet in its output queue to their respective next hops.

For example, consider first node B encoding for broadcast P1⊕P2. Because node C has P1 in its packet pool 205, it could XOR P1 with P1⊕P2 to obtain P2, the native packet designated for it. However, node A does not have P2 and thus cannot decode the encoded packet broadcast by node B to obtain P1. Thus, coding together P1 and P2 would not decrease the time needed to transmit each of packets P1, P2, P3, and P4 to their respective next hops.

Alternatively, now consider node B encoding and transmitting P1⊕P3, which would allow node A to obtain P1 by decoding the encoded packet using P3 and would allow node C to obtain P3 by decoding the encoded packet using P1. Thus, broadcasting P1⊕P3 would allow node B to reduce the number of transmissions by one, as it could transmit P1 to node A and P3 to node C in a single transmission.

A better coding decision for node B would be to transmit P1⊕P3⊕P4. This would allow node A to obtain P1 by using the XOR of P3 and P4 to decode the encoded packet. Node C may obtain P3 by using the XOR of P1 and P4 to decode the encoded packet and node D may obtain P4 by decoding the encoded packet using the XOR of P1 and P3.

In the example of FIG. 2, separate unicast flows are encoded together at some intermediate hop. For example, P1, which is intended for node A, and P3, which is intended for node C, are encoded together at node B, though both nodes A and C receive a packet in which P1 and P3 are encoded together. However, the paths of these two packets may diverge at the next hop. For example, node A may transmit P1 to a next hop node that does not store P3 and P4 and node C may transmit P3 to a next hop node that does not store P1 and P4. Thus, it is important that node A and node C be able to decode the encoded packet to obtain their respective designated native packets so that they can pass these native packets to their next hops, with a possible further (and different) encoding.

Thus, in one embodiment of the invention, a node encoding a packet may verify that the packet may be decoded at its next hop so that any native packet encoded in the encoded packet may be passed on to any subsequent next hops. This may be achieved in any suitable way, as the present disclosure is not limited in this respect. For example, in one implementation, when creating an encoded packet, a node may adhere to the rule that, to transmit n packets, $p_1, \ldots, p_n$, to n next hops, $r_1, \ldots, r_n$, a node can encode the n packets together only if each next hop, $r_i$, has all n−1 packets, $p_j$, where $j \neq i$. Whenever a node transmits a packet, it may choose the largest n that satisfies this rule.

In embodiments that employ this rule, each next hop will be able to decode the received encoded packet to obtain its native packet. However, the present disclosure is not limited to embodiments in which a next hop is capable of decoding an encoded packet. That is, in some embodiments, a node may receive an encoded packet that it is not capable of decoding, but that a subsequent hop is capable of decoding. Thus, the receiving node may transmit the encoded packet to a next hop without decoding it.

In the example of FIG. 2, node B may obtain the packets to be transmitted (i.e., packets P1, P2, P3, and P4) in any suitable way, as the invention is not limited in this respect. For example, in one embodiment, a packet may be initially generated at node B (e.g., by an application program executing on node B). In another embodiment, node B may be an intermediate hop and thus may have received the packet from the packet's previous hop. As used herein, a "previous hop" of a packet at a first node refers to the node that transmitted the packet to the first node, with the first node being the next intended recipient of the packet.

In some embodiments, in which a node is an intermediate hop for a packet (i.e., the node has packet, received from a previous hop, to be transmitted to a next hop), the node may code the packet with one or more other packets to generate an encoded packet and may send the encoded packet to multiple "next hop" nodes. These "next hop" nodes need not have been the previous hop of any packets encoded in the encoded packet.

Thus, for example, in the example of FIG. 2 in which node B codes together P1 and P3 and transmits P1⊕P3, it is not required that node B have received P1 from node C (i.e., node C need not be the previous hop for P1 with respect to node B), nor it is required that node B have received P3 from node A (i.e., node need not be the previous hop for P3 with respect to node B). That is, in the system of FIG. 2, non-duplex flows may be coded together.

In the example of FIG. 2, the capability to transmit an encoded packet from node B to nodes A, C, and D to deliver a different native packet to each of these nodes depends on each of these nodes storing the packets that enable them to decode the encoded packet. A node may obtain packets to temporarily store in its packet pool in any suitable way, as the present disclosure is not limited in this respect. For example, a node may obtain packets for its packet pool by snooping broadcast packets intended for its neighbor nodes and/or storing packets transmitted to it over the broadcast medium.

Applicants' have appreciated that indefinitely storing packets in a node's packet pool may consume a significant amount of memory and may leave many packets in memory that, after a certain amount of time has passed, may never be used. Thus, in one embodiment a packet is only temporarily stored in a node's packet pool. A packet may be stored in a node's packet pool for any suitable amount of time, as the present disclosure is not limited in this respect. In one embodiment, a packet may be stored in a node's packet pool for a time that exceeds the maximal packet latency of the network. In 802.11 wireless networks, the maximal packet latency is typically on the order of tens of milliseconds. Thus, as a conservative estimate, a packet may be stored in the packet pool of a node for such a network for 500 ms, for example.

In another embodiment, a node's packet pool may be cleared at a predefined interval, regardless of how long each packet in the pool has been stored in the pool. The interval at which the packet pool is cleared may be any suitable interval, as the present disclosure is not limited in this respect. For example, the interval may be a time period that exceeds the maximum packet latency of the network (e.g., 500 ms).

In the example of FIG. 2, the capability of node B to encoded packets and transmit them to nodes A, C, and D, so as to deliver a different native packet to each of these nodes depends on node B being aware of which packets are stored in each of its neighbor nodes packet pools. A node may obtain information about which packets are stored in its neighbor's packet pools in any suitable way, as the present disclosure is not limited in this respect. In one embodiment, for example, each node may announce to its neighbor nodes the packet(s) stored in its packet pool by transmitting a reception report, which identifies the packets that the node has stored. Thus, by receiving the reception reports transmitted by its neighbor nodes, a node may be aware of the packets stored by its neighbor nodes.

A node may store a reception report received from a neighbor node for any suitable amount of time, as the present disclosure is not limited in this respect. In one embodiment, the amount of time that a node stores a reception report may be a time greater than or equal to the round-trip transmit latency in the network (e.g., ~100 ms in an 802.11 network).

Additionally, a node may transmit a reception report of the packets stored in its packet pool at any suitable interval. This interval may be a regular interval or an irregular interval. As discussed in greater detail below, in one embodiment, the frequency with which a node transmits reception reports may be related to the frequency with which the node transmits packets to other nodes. In another embodiment, the frequency with which a node transmits reception reports may be equal to the amount of time that a packet remains stored in the node's packet pool or the interval at which the packet pool of a node is cleared.

It should be appreciated that different nodes need not store packets in their packet pools for the same amount of time (though they may), and that each node may store packets in its respective packet pool for a different amount of time, as the present disclosure is not limited in this respect. Further, different nodes may transmit reception reports at different intervals and may store reception reports for different periods of time, as the present disclosure is not limited in this respect.

In one embodiment, a sending node may transmit an encoded packet for receipt by a receiving node if the sending node determines that the receiving node is capable of computing the native packet intended for the receiving node from the encoded packet, even though the receiving node may not store all of the native packets needed to decode the encoded packet. For example, the sending node may transmit the encoded packet $P1 \oplus P3 \oplus P4$ to allow the receiving node to obtain P4, though the receiving node may not store P1 and P3 as native packets. However, if the sending node determines that the receiving node stores $P1 \oplus P3$, it may transmit the encoded packet to the receiving node because the receiving node is capable of computing P4 from the encoded packet using $P1 \oplus P3$.

In another embodiment, rather than use a reception report to determine which packets a given neighbor nodes stores, a node may guess which packets the neighbor node stores. This may be done in a system that does not employ reception reports or may be done in a system that uses reception reports, at a time when those reception reports are not available. That is, for example, in a wireless 802.11 network, in situations where there is severe network congestion, reception reports may be lost in collisions. Additionally, at times of light traffic, a reception report may arrive too late to be practically employed.

A node may guess which packets a neighbor node stores in any suitable way, as the present disclosure is not limited in this respect. For example, in one embodiment in which a wireless 802.11 network is used, the wireless routing protocol may be used to guess whether a particular neighbor node stores a particular packet. That is, wireless routing protocols compute the delivery probability between every pair of nodes and use it to identify good paths. One example of a metric used to compute delivery probability is the ETX metric, known to those of skill in the art, which periodically computes a delivery probability and assigns each link a weight equal to 1/(delivery probability). The weights may be broadcast to all nodes in the network and may be used by a link state routing protocol to compute shortest paths. Thus, the probability that a neighbor node has a packet at a given time may be estimated as the delivery probability of the link between the packet's previous hop and the neighbor node. If the probability equals or exceeds a certain threshold, then the node may assume that its neighbor node stores the packet. Any suitable threshold may be used, as the present disclosure is not limited in this respect.

In another embodiment that employs an 802.11 wireless network, a node may assume that its neighbor node stores a particular packet if the neighbor node is closer (i.e., in physical distance) to the packet's previous hop node than the node itself. Thus, if a node receives a packet from neighbor A, it assumes that all neighbor nodes closer to neighbor A than itself also have the packet. As discussed above, a node may learn the location of other nodes in the network by having all nodes broadcast link state information. This information may be used to determine distance to each neighbor, for example, using the above-discussed ETX metric. Alternatively, the nodes may use global positioning satellite (GPS) methods to locate themselves and broadcast their GPS positions to other nodes in the network.

Applicants have appreciated that in some situations in which a node guesses that its neighbor node has a particular packet, the node may guess incorrectly and may transmit an encoded packet to the neighbor node that the neighbor node is incapable of decoding. In such cases, the relevant native packet may be retransmitted to the neighbor node, potentially coded together with a new set of native packets.

As discussed above in connection with FIG. 2, a node may have multiple options as to which packets to code together. That is, in the example of FIG. 2, node B could have transmitted $P1 \oplus P3$, which would have allowed node A to obtain P1 and would have allowed node C to obtain P3 by decoding the encoded packet using P1. Alternatively, node B could have transmitted $P1 \oplus P3 \oplus P4$, which would have allowed node A to obtain P1, node C to obtain P3, and node D to obtain P4. In embodiments of the present disclosure, to make a decision as to which packets to code together, a node may employ any suitable algorithm, as the present disclosure is not limited in this respect.

Figure 3:
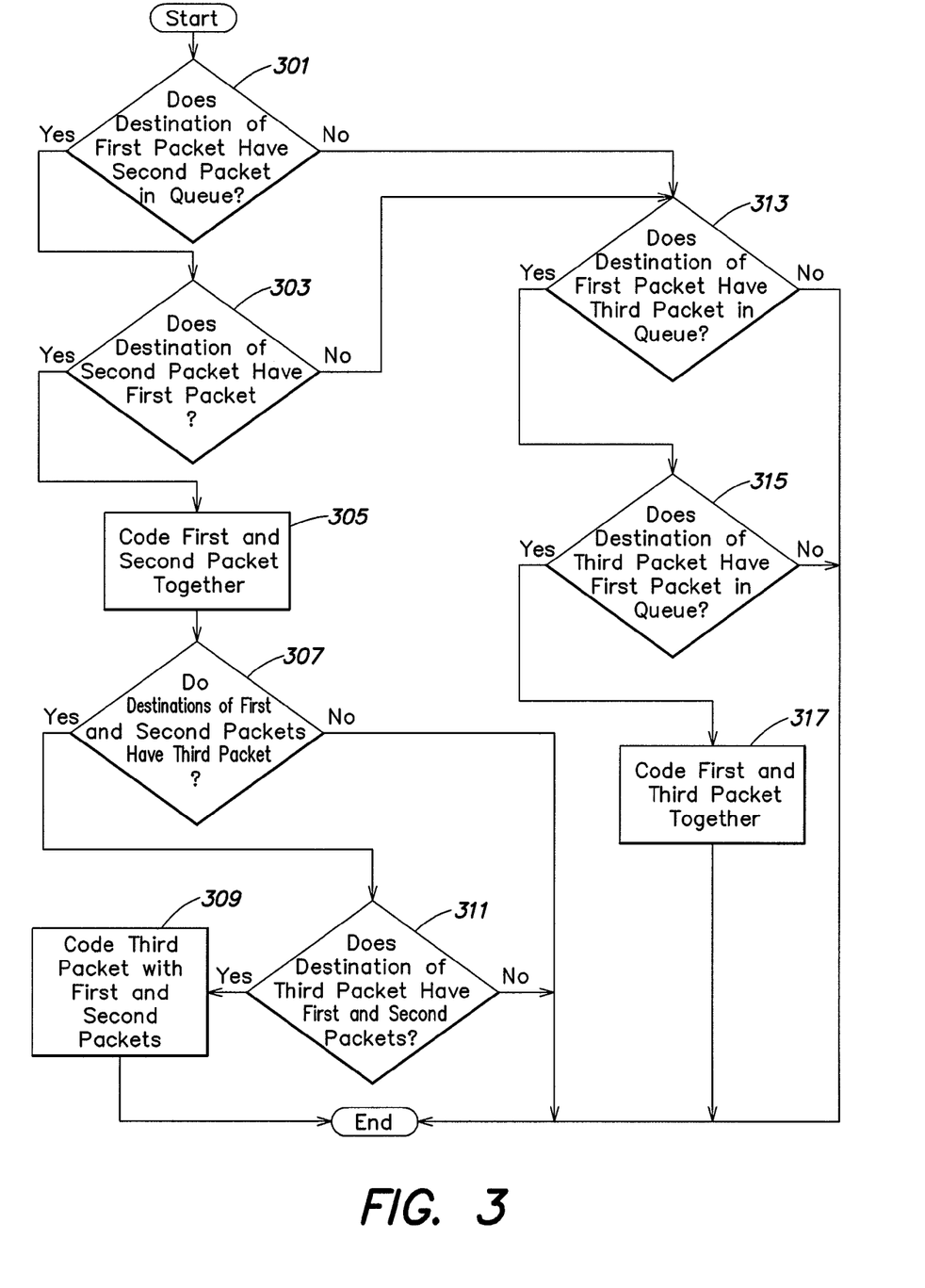
FIG. 3 is a flow chart of an illustrative process for determining which packets in an output queue to code together, in accordance with one embodiment.

An example process a node may use for determining which packets to code together is shown in FIG. 3. Each node may have an output queue (e.g. a FIFO) of packets to be transmitted. For the purposes of clarity, the example process of FIG. 3 is a process for determining which packets to code together in an output queue having three packets. However, it will be readily apparent to those of skill in the art that this process may easily be adapted for an output queue having any number of packets.

The process begins at act 301, where the node determines whether the destination for the first packet in the node's output queue has the second packet in the queue stored in the destination node's packet pool. If so, the process continues to act 303, where the node determines whether the destination node for the second packet in the queue has the first packet in the queue stored in the destination node's packet pool. If so, the process continues to act 305 where the first and second packets are coded together. The process then continues to act 307, where the node determines if the respective destination nodes for the first and second packets have the third packet stored. If so, the process continues to act 311, where the node determines if the destination of the third packet has the first and second packet stored. If so, the process continues to act 311, where the third packet is coded together with the first and second packets. The process then ends and the node may broadcast the encoded packet that is encoded with the first, second, and third native packets. These packets may then be removed from the output queue.

If, at acts 301 and 303, it is determined that the destination of the first packet does not store the second packet or the destination of second packet does not store the first packet, the process continues to act 313, where the node determines whether the destination of the first packet stores the third packet. If so, the process continues to act 315, where the node determines whether the destination of the third packet stores the first packet. If so, the process continues to act 317, where the first and third packets are coded together. The process then ends and the node may transmit the encoded packet that includes both the first and third native packets. The first and third packets may then be removed from the output queue.

If, at acts 313 and 315, it is determined that the destination of the first packet does not store the third packet or the destination of the third packet does not store the first packet, then it is not possible to code the first packet with any of the other packets in the output queue and the process ends. The node may then transmit the native first packet and remove it from the queue.

If, at acts 307 and 311, it is determined that the destinations of the first and second packet do not each store the third packet or that the destination of the third packet does not store both the first and second packets, then the process ends. The node may then transmit the encoded packet that codes together the first and second native packets and remove these packets from the output queue.

In the example process of FIG. 3, the encoding/transmitting node, at various stages of the process, determines if its neighbor nodes have certain packets. As should be appreciated from the foregoing discussion, this determination may be made in any suitable way, such as using reception reports or guessing that a neighbor node has a particular packet.

Further, in the example of FIG. 3, two or more packets may be coded together regardless of the size of these packets. However, in some embodiments, preference is given to coding together packets of similar length. This may be done because coding small packets with larger ones reduces bandwidth savings. Preference may be given to coding packets of similar size together in any suitable way, as the present disclsosure is not limited in this respect.

For example, in one embodiment, packets may either be treated as small packets or large packets. Any suitable threshold may be used to differentiate between small and large packets, as the present disclosure is not limited in this respect. In one embodiment, the threshold may be, for example, 100 bytes. Each node may maintain an output queue of packets to be transmitted and may maintain two virtual queues for each neighbor node. The first of these queues is a "small virtual queue" for small packets and the second is a "large virtual queue" for large packets. The virtual queues for a neighbor node contain pointers to the packets in the output queue whose next hop is the neighbor node.

Thus, if the packet at the head of the output queue is a small packet, then the process of FIG. 3 is performed first treating only the packets identified in the small virtual queue for each neighbor node as the packets whose next hop is that node, and then is repeated treating only the packets identified in the large virtual queue for each neighbor node as the packets whose next hop is that node. Conversely, if the packet at the head of the output queue is a large packet, then the process of FIG. 3 is performed first treating only the packets identified in the large virtual queue for each neighbor node as the packets whose next hop is that node, and then is repeated treating only the packets identified in the small virtual queue for each neighbor node as the packets whose next hop is that node. This process gives preference to coding packets of the same size together, because once packets of the same size (i.e., small or large) are selected to be coded together, it is less likely that the destination of a packet of the other size will have stored all the packets that have already been selected to be coded together.

However, in cases where small and large packets are encoded together the smaller packets may be padded with zeros. The zeros may be removed at the receiving node. This may be done in any suitable way, as the present disclosure is not limited in this respect. For example, in an IP network, the receiving node may determine the packet size from the IP packet header and may remove the excess zeros.

An example pseudocode algorithm for determining which packets to code together that gives preference to coding together packets of similar size is shown below in Table 1. It should be appreciated that this is but one example of an algorithm and the invention is not limited to this or any other particular algorithm.

TABLE 1

```
Pick packet p at the head of the output queue.
Native = {p}
Nexthops = {nexthop(p)}
if size (p) > 100 bytes then
    which_queue = 1
else
    which_queue = 0
end if
for Neighbor i = 1 to M do
    Pick packet p_i, the head of virtual queue Q(i, which_queue)
    if ∀ n ∈ Nexthops ∪ {i}, Pr[n can decode p ⊕ pi] ≧ G then
        p = p ⊕ p_i
        Natives = Natives ∪ {p_i}
        Nexthops = Nexthops ∪ {i}
    end if
end for
which_queue = !which_queue
for Neighbor i = 1 to M do
    Pick packet p_i, the head of virtual queue Q(i, which_queue)
```

TABLE 1-continued

```
if ∀ n ∈ Nexthops ∪ {i}, Pr[n can decode p ⊕ pi] ≥ G then
    p = p ⊕ pi
    Natives = Natives ∪ {p_i}
    Nexthops = Nexthops ∪ {i}
  end if
end for
return p
```

In the examples above, packets are coded together prior to transmission to reduce the number of transmissions required to transmit packets to their destinations and increase network throughput. Any suitable coding algorithm may be used to code packets together, as the present disclosure is not limited in this respect. In one embodiment, an XOR function is used to code packets together. However, it should be appreciated that the present disclosure is not limited to this or any other particular coding algorithm, as any suitable coding algorithm may be used. For example, in one embodiment, packets may be coded together by computing linear combinations of the packets over a finite field. That is, an encoded message $X_k$ may be generated using the relation in Table 2, where S is the number of source nodes, $M_i$ is one of the messages to be encoded, and the values of $g_k^i$ are the coefficients from the Galois field $GF(2^S)$.

TABLE 2

$$X_k = \sum_{i=1}^{S} g_k^i \cdot M_i$$

As discussed above, some embodiments of the invention may be implemented in an 802.11 wireless network. In 802.11 wireless networks, each node operates a medium access control (MAC) layer, which manages communications between nodes by coordinating access to a shared radio channel. The 802.11 standard defines two modes of operation for the MAC layer: unicast mode and broadcast mode. In unicast mode, the link-layer destination field specifies the MAC address of the network node that is the intended recipient of the packet. When the intended destination node receives the packet, it immediately transmits an acknowledgement of receipt. The sending node retransmits the packet a fixed number of times until an acknowledgement is received. If an acknowledgment is not received, the transmitting node assumes that a collision has occurred and backs off the channel (i.e., reduces its transmission rate) to free up network bandwidth.

In broadcast mode, a packet has many intended receivers, thus acknowledgements of receipt of the packet are not transmitted. Because no acknowledgements are transmitted in this mode, packets are not retransmitted in case of failure of receipt. Further, lack of receipt acknowledgements presents challenges for the broadcasting node in recognizing collisions. Thus, in the broadcast mode, broadcasting nodes do not back off the channel. Applicants have appreciated that if multiple backlogged nodes share the broadcast channel, and each of them continues sending at the highest rate, the resulting throughput may be poor, due to high collision rates. The problem of high collision rates is compounded by the lack of retransmissions in cases of nonreceipt and, consequently, results in low reliability.

Because of the high collision rate and low reliability of the broadcast mode, Applicants have appreciated that the MAC broadcast mode may be ill-suited for some embodiments (though it may be used in other embodiments). Thus, in such embodiments, the unicast mode may be used, but an additional packet header may be inserted into each packet which identifies, inter alia, each node that is an intended recipient of the packet. Thus, while the destination field of the link-layer header identifies only one of the packet's intended recipients, the additional packet header (hereinafter referred to as a "coding header") may identify the other neighbor nodes for whom the packet is intended. All nodes may be set in "promiscuous mode" allowing them to "snoop" packets that identify other nodes as the destination in the link-layer header.

Thus, in one embodiment, when a node receives a packet which specifies a MAC address different from its own in the destination field of the link-layer header, it may check the coding header to see if it is an intended recipient of the packet. If so, it may process the packet further and, if not, it may store the packet in its packet pool as an opportunistically received packet.

As discussed above, in the 802.11 unicast mode, when a node receives a packet that specifies its MAC address in the destination field of the link-layer header, the node transmits an acknowledgement that it has received the packet. However, if the packet is an encoded packet that is intended for multiple nodes, only the node that is specified in the destination field of the link layer header will transmit an acknowledgement. Nonetheless, it may be desirable that every node which is an intended recipient of the packet transmit an acknowledgement so that, for example, if the sending node has incorrectly guessed that one of the recipient nodes stores a packet necessary to decode the encoded packet and obtain its designated native packet, the lack of an acknowledgement from that node may serve as signal to the sending node to retransmit the native packet intended for that node.

Thus, in one embodiment, in addition to the receipt acknowledgements generated by the MAC layer, each neighbor node that receives a packet which is intended for it may transmit an acknowledgement that indicates that it has received the packet and, if necessary, has successfully decoded the packet to obtain its intended native packet. Such acknowledgements may be transmitted synchronously or asynchronously, as the present disclosure is not limited in this respect.

Applicants have appreciated that, in some situations, transmitting acknowledgements for encoded packets synchronously (i.e., at the time of receipt of the packet) may be inefficient, as the overhead from sending the acknowledgement in a separate packet with the necessary headers may be excessive. Thus, in one embodiment, acknowledgements for encoded packets may be transmitted asynchronously. This may be done in any suitable way, as the present disclosure is not limited in this respect.

For example, in one embodiment, when a node receives an encoded packet for which it is an intended recipient, it schedules an acknowledgement event. Before transmitting a packet, a node checks whether it has any pending acknowledgement events and, if so, adds the acknowledgements into the coding header. If a node has no packets to transmit, it may place the acknowledgements in periodically transmitted control packets used to maintain and manage the wireless network.

Thus, in one embodiment, when a node sends an encoded packet, it schedules a retransmission event for each of the native packets in the encoded packet. If the node does not receive a receipt acknowledgement for one of these native packets within a certain period of time after transmission of the encoded packet, the packet is reinserted at the head of the output queue and is retransmitted (possibly coded together with other native packets). If an acknowledgement for a native packet is received within the period of time, then the scheduled retransmission of that native packet is canceled. The time period that a node waits before retransmitting native packets for which a receipt acknowledgement is not received may be any suitable time period, as the present disclosure is not limited in this respect.

Figure 5:
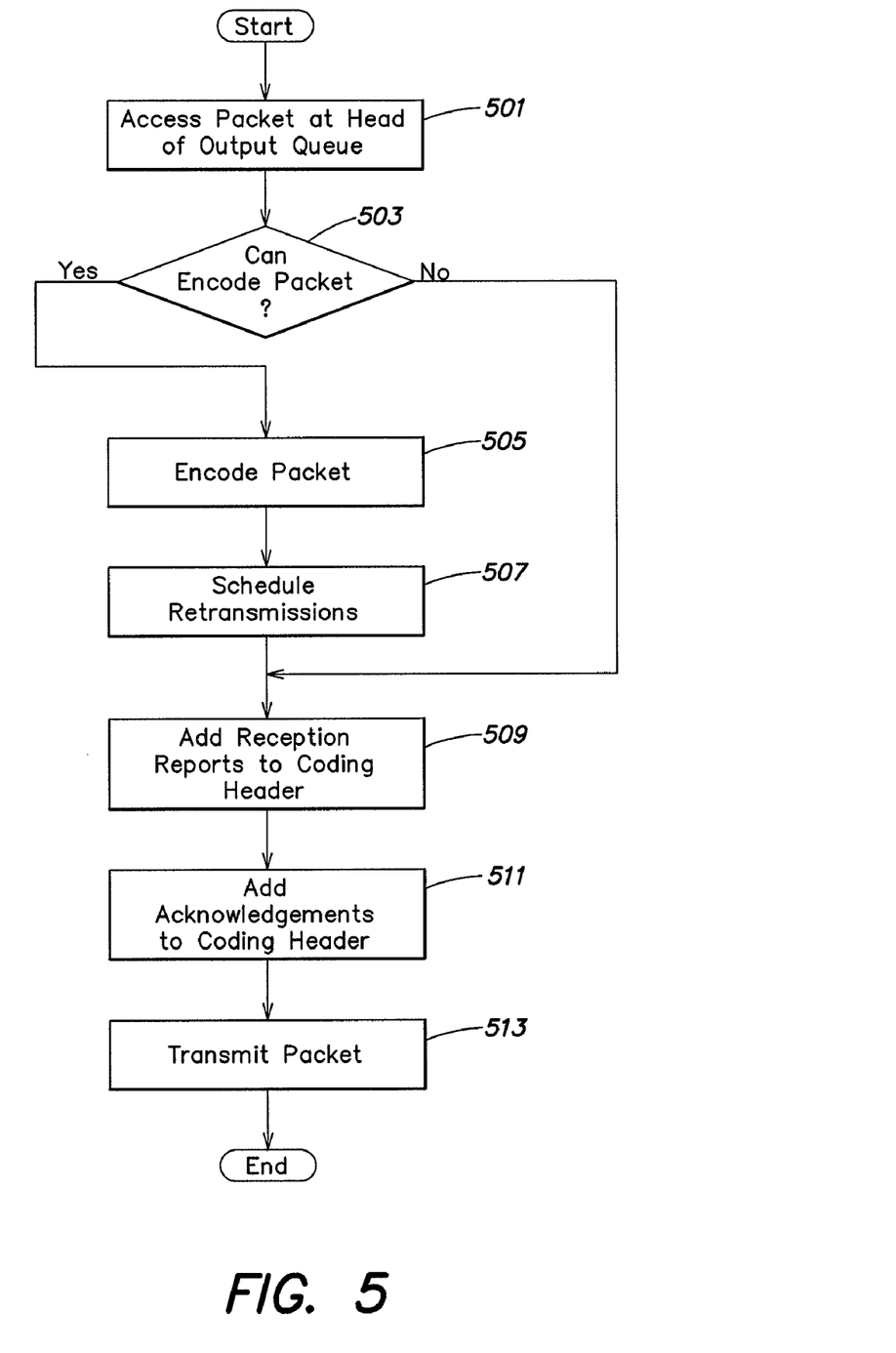
FIG. 5 is a flow chart of an illustrative process for sending a packet, in accordance with one embodiment.

FIG. 5 is a flow chart of an illustrative process that may be used by a node to transmit a packet having a coding header, according to one embodiment of the present disclosure. The process begins at act 501, where the node accesses the packet at the head of its output queue. The process then continues to act 503, where it determines if the packet at the head of the output queue can be coded together with other packets (e.g., using the process discussed above in connection with FIG. 3). If so, the process continues to act 505, where the packet is coded together with other packets, and next continues to act 507, where retransmission of each native packet coded in the encoded packet is scheduled (i.e., in case a receipt acknowledgement for that packet is not received). The process then continues to act 509.

If, at act 503, it is determined that the packet cannot be encoded, the process continues to act 509. At act 509, the node adds to the coding header any reception reports awaiting transmission. The process then continues to act 511, where any receipt acknowledgments awaiting transmission are added to the coding header. The process next continues to act 513, where the packet is transmitted.

Figure 6:
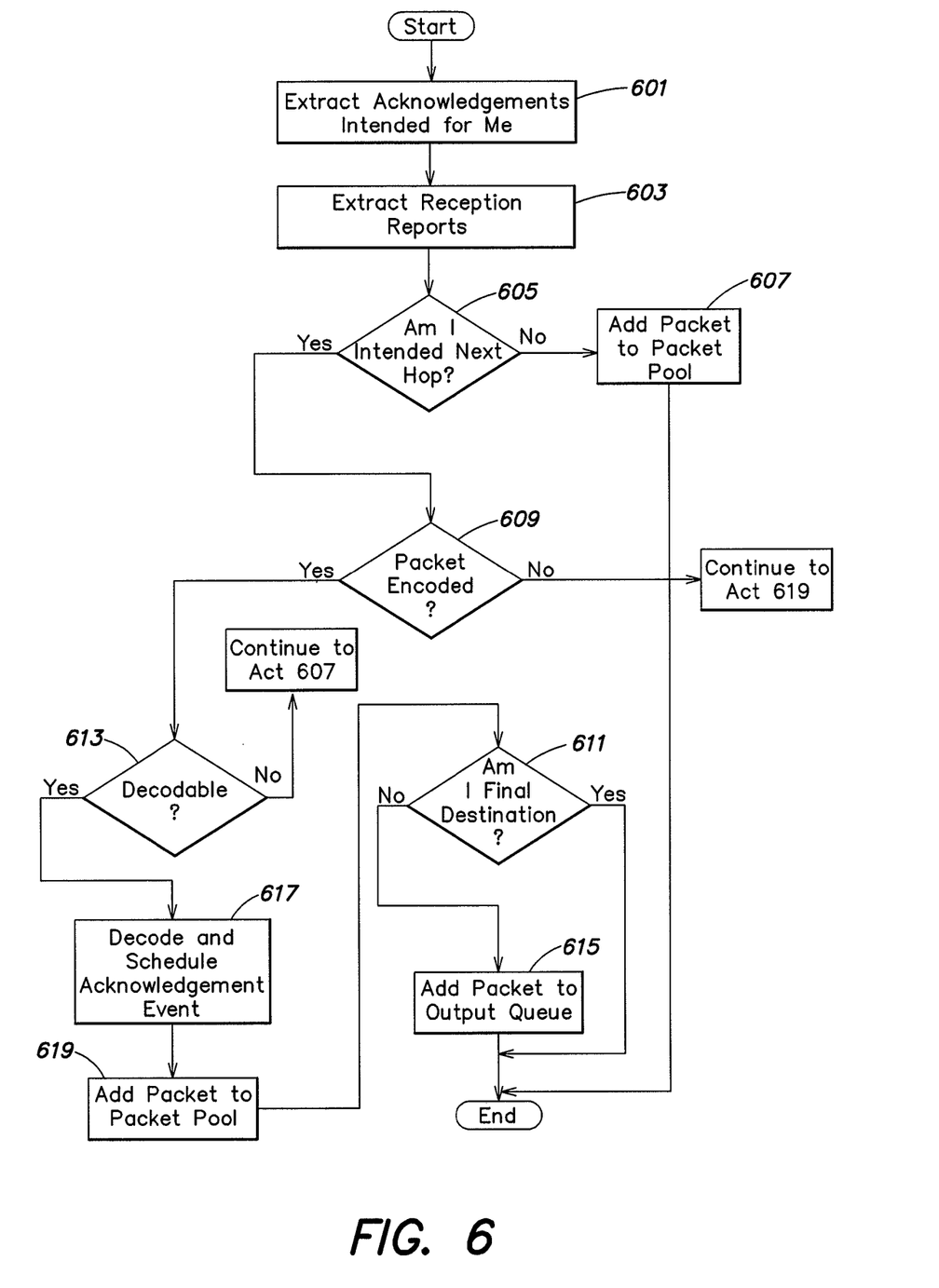
FIG. 6 is a flow chart of an illustrative process for processing a received packet, in accordance with one embodiment.

FIG. 6 is a flow chart of an illustrative process that may be used by a node to process a received packet having a coding header, according to one embodiment of the invention. The process begins at act 601, where the node extracts any receipt acknowledgements intended for it from the coding header. The process then continues to act 603, where the node extracts reception reports from its neighbor nodes from the coding header. The process then continues to act 605, where the node determines if it is an intended next hop of the packet (i.e., the packet was intentionally transmitted to it) or if the packet is one that it has opportunistically snooped. If it is determined that the node is not an intended next hop of the packet, but rather the packet was opportunistically snooped, the process continues to act 607 where the packet is added to the node's packet pool and the process ends.

If, at act 605, it is determined that the node is the intended next hop, the process continues to act 609, where it is determined if the packet is encoded (e.g., using information in the coding header). If the packet is encoded, the process continues to act 613, where it is determined if the packet is decodable. A packet is decodable if the node has, in its packet pool, the native packets to decode the encoded packet and obtain the native packet intended for it. If the packet is decodable, the process continues to act 617, where the node decodes the packet and schedules an acknowledgement event (i.e., a future transmission of an acknowledgement receipt of the packet).

The process then continues to act 619 where the decoded packet is added to the node's packet pool. The process next continues to act 611, where the node determines if it is the final destination of the packet. This may be done in any suitable way. For example, in one embodiment, the network and/or transport layer headers of the packet may identify the destination node of the packet and this information may be used to determine if the node is the final destination or only an intermediate hop. If so, the process ends and the node can hand the packet off to the higher layers in the network stack for ultimate use by the application program for which the packet is intended. Otherwise, the process continues to act 615, where the packet is added to the node's output queue to await transmission to its next hop.

If, at act 613, it is determined that the packet is not decodable, then the process continues to act 607, where the packet is added to the packet pool and the process ends.

If, at act 609, it is determined that the packet is not encoded, the process continues to act 619, where it is added to the packet pool. The process then continues to act 611, as discussed above.

Figure 4:
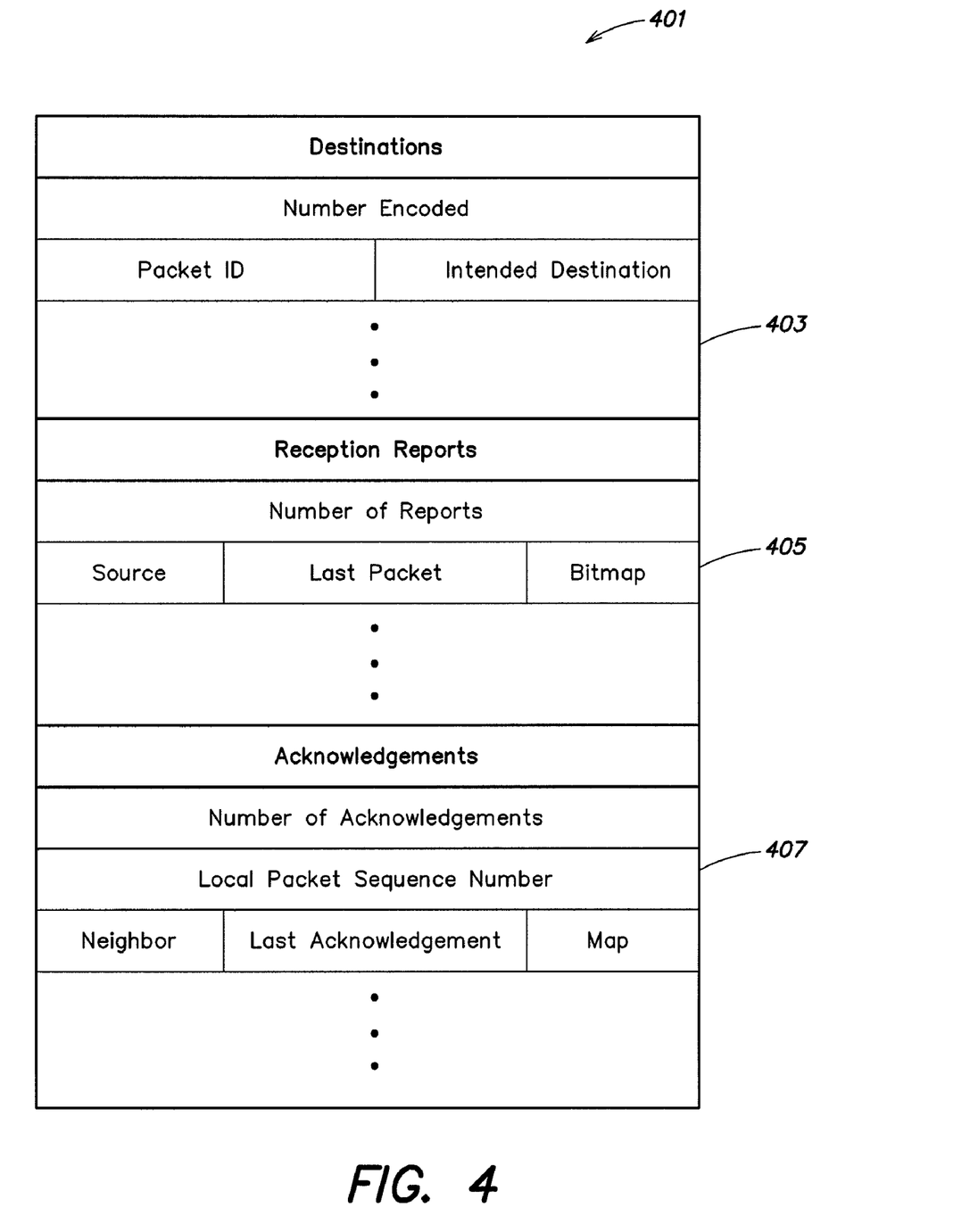
FIG. 4 is a diagram of a coding header for a packet, in accordance with one embodiment.

A diagram of an illustrative coding header that may be used in some embodiments of the present disclosure is shown in FIG. 4. The coding header may be placed in any suitable location in a packet, as the present disclosure is not limited in this respect. For example, in one embodiment, the header may be inserted in between the link-layer header (e.g., a MAC header in an 802.11 wireless network) and the network layer header (e.g., an IP header in an IP network). Alternatively, in embodiments in which the wireless routing protocol has its own header, the coding header may be inserted in between the link layer header and the routing protocol header.

In FIG. 4, coding header 401 includes three sections: a destinations block 403; a reception reports block 405; and an acknowledgements block 407. Destinations block 403 includes metadata to assist receiving nodes in decoding packets. The destinations block includes a Number Encoded field that indicates the number of packets that were coded together to generate the coded packet. For example, if four packets were XORed together to generate a coded packet the Number Encoded field in the Destinations block of the coding header for the packet would have the value four. In addition, for each native packet coded in the encoded packet, the destinations block lists the packet identifier for the native packet. Any suitable identifier may be used, as the present disclosure is not limited in this respect. For example, in one embodiment, the packet identifier may be a hash of the source IP address and the IP sequence number. The Destinations block also provides, for each packet identifier, the destination node of the corresponding packet. The destination node may be identified in any suitable way, such as, for example using its MAC address.

Reception Reports block 405 includes reception reports to be transmitted by the sending node. As discussed above, a reception report is a report of the packets temporarily stored in a node's packet pool. Thus, the reception reports included in the coding header of a packet identify the packets stored in packet pool of the node transmitting the packet. In one embodiment, the coding header may include multiple reception reports, as each reception report identifies the packets that the node has received and stored from a particular source. As shown in block 405, the reception reports block includes a Number Of Reports field that indicates the number of reception reports in the header. The Receptions Report block further includes an entry for each reception report that includes three fields: a Source field that identifies the source of the reported packets (e.g., using its IP address); a Last Packet field that identifies the sequence number (e.g., the IP sequence number) of the last packet received from that source; and a Bitmap field, which is a bitmap of the packets temporarily stored in the source's packet pool. For example, an entry in the form of {128.0.1.9, 50, 10000001} indicates that the node sending the packet has received packet 50 from the node with IP address 128.0.1.9, and it has also heard packets 42 and 49 from that source, but none in between.

Acknowledgements block 407 includes acknowledgements of successful receipt and decoding of previously-received encoded packets. In one embodiment, a node may maintain a counter (hereinafter referred to as a sequence number counter) for each of its neighbor nodes. Whenever the node sends a packet to one of its neighbors it increments its sequence number counter for that neighbor and assigns that number to the packet as a local sequence number. The two nodes may then use this sequence number to identify the packet.

Acknowledgements block 407 includes a Number Of Acknowledgements field that indicates the number of acknowledgements in block 407. Block 407 also identifies the local packet sequence number for the packet in which the header appears. In addition, block 407 includes an entry for each acknowledgement, which contains three fields: a Neighbor field which identifies the neighbor from which the packet was received, a Last Acknowledgement field, which indicates the last packet being acknowledged by this acknowledgement, and a Map field, which is a bitmap indicating previously received and missing packets. Thus, for example, an entry of {A, 50, 01111111} acknowledges receipt of packet 50 from neighbor node A, acknowledges receipt of packets 43-49 from neighbor node A, but indicates that packet 42 is still missing.

The examples above discuss techniques for receipt acknowledgements and retransmissions in an 802.11 wireless network. However, the use of these techniques is not limited to use in 802.11 wireless networks and it is readily apparent to those of skill in the art that such techniques may adapted to other types of networks, such as Ethernet networks or cellular telephone networks.

When an encoded packet is received by a network node, the node may decode the packet in any suitable way, as the invention is not limited in this respect. As discussed above, each node maintains a packet pool which is a buffer in which packets received and sent by the node are stored. The packets may be stored in the packet pool in any suitable way, as the invention is not limited in this respect. For example, in one embodiment, the packet pool takes the form of a hash table keyed on the packet identifier. As discussed above, any suitable identifier may be used, such as, for example, a hash of the source IP address of the packet's source and the packet's IP sequence number. When a node receives an encoded packet that codes together n native packets, the node may determine the identifiers of the native packets encoded in the packet from the coding header. The node may then retrieve each of these native packets from its packet pool using the identifier and XOR the n-1 retrieved native packets with the encoded packet to obtain the native packet intended for it.

In the examples above, nodes transmit, receive, and encode packets. However, a packet is only one example of a type of message that may be communicated between or amongst nodes. The invention is not limited to sending packets as any suitable type of message may be sent. For example, in some embodiments, a message may include a portion of packet or a sequence of packets. In some embodiments a message may include a frame (e.g. an IP frame), a portion of a frame, or a sequence of frames, and in some embodiments a message may include a cell (e.g., an ATM cell), a portion of a cell, or a series of cells.

The above-discussed techniques for encoding, decoding, and transmitting packets may be implemented in any suitable way. For example, these techniques may be implemented in hardware, software, or any combination thereof and may be implemented in any suitable location, such as, for example, in the network adapter of network nodes, the computers in which such network adapters reside, and/or any other suitable location.

When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. Further, when the embodiments are implemented in software, such software may be accessed via download over a network.

It should be appreciated that one implementation of the present disclosure comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present disclosure. The computer-readable medium can be transportable such that the program stored thereon can be loaded onto any computer environment resource to implement the aspects of the present disclosure discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present disclosure.

It should be appreciated that in accordance with several embodiments of the present disclosure wherein processes are implemented in a computer readable medium, the computer implemented processes may, during the course of their execution, receive input manually (e.g., from a user and/or via external electrical connection).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of transmitting data from a sending network node over a network comprising a plurality of nodes including the sending network node, at least some of the plurality of nodes being coupled by a broadcast medium, wherein the sending network node has a queue of messages to be transmitted, the queue including a first message received from a first previous hop and a second message received from a second previous hop, and wherein the method comprises acts of:

identifying the first message to be transmitted from the sending network node to a first destination node via a first network node;

identifying the second message to be transmitted from the sending network node to a second destination node via a second network node, wherein the second network node is not the first previous hop;

determining whether the first network node stores the second message;

determining whether the second network node stores the first message;

if it is determined that the first network node stores the second message and the second network node stores the first message, coding together the first and second messages to generate an encoded message; and transmitting the encoded message over the broadcast medium.

2. The method of claim 1, further comprising acts of:

identifying a third message in the queue to be transmitted from the sending network node to a third destination node via a third network node;

determining whether the first and second network nodes store the third message;

determining whether the third network node stores the first and second messages; and when it is determined that the first and second network nodes store the third message and the third network node stores the first and second messages, coding together the first, second, and third messages to generate the encoded message.

3. The method of claim 1, wherein the network is a wireless network and the broadcast medium is air.

4. The method of claim 1, wherein the broadcast medium includes at least one network cable.

5. The method of claim 1, wherein each of the plurality of nodes is a processor in a parallel computer and the broadcast medium includes at least one communication bus.

6. The method of claim 1, wherein the first destination node and the first network node are different nodes.

7. The method of claim 1, wherein the first destination node and the first network node are the same node.

8. The method of claim 1, wherein the second destination node and the second network node are different nodes.

9. The method of claim 1, wherein the second destination node and the second network node are the same node.

10. The method of claim 1, wherein the first and second destination nodes are different nodes.

11. The method of claim 1, wherein the first and second destination nodes are the same node.

12. The method of claim 1, wherein the first and second network nodes are different nodes.

13. The method of claim 1, wherein the act of coding together the first and second messages to generate the encoded message further comprises an act of XORing the first and second messages to generate the encoded message.

14. The method of claim 1, wherein the act of coding together the first and second messages to generates the encoded message further comprises an act of computing linear combinations of the first and second messages over a finite field to generate the encoded message.

15. The method of claim 1, further comprising an act of:

scheduling a retransmission of the first message to occur if an acknowledgment of receipt of the first message by the first network node is not received within a predetermined period of time.

16. The method of claim 1, further comprising an act of:

scheduling a retransmission of the second message to occur if an acknowledgment of receipt of the second message by the second network node is not received within a predetermined period of time.

17. The method of claim 1, wherein the sending network node includes a message pool in which messages received over the network are temporarily stored, and wherein the method further comprises an act of:

including in the encoded message a reception report that identifies at least a portion of the messages stored in the message pool of the sending network node.

18. The method of claim 1, wherein the act of determining whether the first network node stores the second message further comprises an act of:

determining whether the first network node stores the second message using a reception report received from the first network node that identifies at least some of the messages stored by the first network node.

19. The method of claim 1, wherein the act of determining whether the second network node stores the first message further comprises an act of:

determining whether the first network node stores the second message using a reception report received from the first network node that identifies at least some of the messages stored by the first network node.

20. The method of claim 1, wherein the act of determining whether the first network node stores the second message further comprises an act of:

probabilistically determining whether the first network node stores the second message.

21. The method of claim 1, wherein the act of determining whether the second network node stores the first message further comprises an act of:

probabilistically determining whether the second network node stores the first message.

22. The method of claim 1, wherein the act of determining whether the first network node stores the second message further comprises an act of:

determining whether the first network node is capable of computing the second message.

23. The method of claim 1, further comprising acts of:

receiving the encoded message at the first network node; and decoding the encoded message at the first network node using the second message to obtain the first message.

24. The method of claim 23, wherein the act of decoding the encoded message further comprises an act of:

XORing the encoded message and the second message.

25. The method of claim 23, further comprising an act of:

adding the first message to a message pool on the first network node.

26. The method of claim 1, wherein the first message comprises at least a portion of a packet.

27. The method of claim 1, wherein the first message comprises at least a portion of a frame.

28. The method of claim 1, wherein the first message comprises at least a portion of a cell.

29. The method of claim 1, wherein the first message comprises a sequence of packets.

30. The method of claim 1, wherein the first message comprises a sequence of frames.

31. The method of claim 1, wherein the first message comprises a sequence of cells.

32. At least one non-transitory computer readable medium encoded with instructions that, when executed, perform a method of transmitting data from a sending network node over a network comprising a plurality of nodes including the sending network node, at least some of the plurality of nodes being coupled by a broadcast medium, wherein the sending network node has a queue of messages to be transmitted, the queue including a first message received from a first previous hop and a second message received from a second previous hop, and wherein the method comprises acts of:

identifying the first message to be transmitted from the sending network node to a first destination node via a first network node;

identifying the second message to be transmitted from the sending network node to a second destination node via a second network node, wherein the second network node is not the first previous hop;

determining whether the first network node stores the second message;

determining whether the second network node stores the first message;

if it is determined that the first network node stores the second message and the second network node stores the first message, coding together the first and second messages to generate an encoded message; and transmitting the encoded message over the broadcast medium.

33. The at least one computer readable medium of claim 32, wherein the method further comprises acts of:

identifying a third message in the queue to be transmitted from the sending network node to a third destination node via a third network node;

determining whether the first and second network nodes store the third message;

determining whether the third network node stores the first and second messages; and when it is determined that the first and second network nodes store the third message and the third network node stores the first and second messages, coding together the first, second, and third messages to generate the encoded message.

34. The at least one computer readable medium of claim 32, wherein the network is a wireless network and the broadcast medium is air.

35. The at least one computer readable medium of claim 32, wherein the broadcast medium includes at least one network cable.

36. The at least one computer readable medium of claim 32, wherein each of the plurality of nodes is a processor in a parallel computer and the broadcast medium includes at least one communication bus.

37. The at least one computer readable medium of claim 32, wherein the first destination node and the first network node are different nodes.

38. The at least one computer readable medium of claim 32, wherein the first destination node and the first network node are the same node.

39. The at least one computer readable medium of claim 32, wherein the second destination node and the second network node are different nodes.

40. The at least one computer readable medium of claim 32, wherein the second destination node and the second network node are the same node.

41. The at least one computer readable medium of claim 32, wherein the first and second destination nodes are different nodes.

42. The at least one computer readable medium of claim 32, wherein the first and second destination nodes are the same node.

43. The at least one computer readable medium of claim 32, wherein the first and second network nodes are different nodes.

44. The at least one computer readable medium of claim 32, wherein the act of coding together the first and second messages to generate the encoded message further comprises an act of XORing the first and second messages to generate the encoded message.

45. The at least one computer readable medium of claim 32, wherein the act of coding together the first and second messages to generates the encoded message further comprises an act of computing linear combinations of the first and second messages over a finite field to generate the encoded message.

46. The at least one computer readable medium of claim 32, wherein the method further comprises an act of:

scheduling a retransmission of the first message to occur if an acknowledgment of receipt of the first message by the first network node is not received within a predetermined period of time.

47. The at least one computer readable medium of claim 32, wherein the method further comprises an act of:

scheduling a retransmission of the second message to occur if an acknowledgment of receipt of the second message by the second network node is not received within a predetermined period of time.

48. The at least one computer readable medium of claim 32, wherein the sending network node includes a message pool in which messages received over the network are temporarily stored, and wherein the method further comprises an act of:

including in the encoded message a reception report that identifies at least a portion of the messages stored in the message pool of the sending network node.

49. The at least one computer readable medium of claim 32, wherein the act of determining whether the first network node stores the second message further comprises an act of:

determining whether the first network node stores the second message using a reception report received from the first network node that identifies at least some of the messages stored by the first network node.

50. The at least one computer readable medium of claim 32, wherein the act of determining whether the second network node stores the first message further comprises an act of:

determining whether the first network node stores the second message using a reception report received from the first network node that identifies at least some of the messages stored by the first network node.

51. The at least one computer readable medium of claim 32, wherein the act of determining whether the first network node stores the second message further comprises an act of:

probabilistically determining whether the first network node stores the second message.

52. The at least one computer readable medium of claim 32, wherein the act of determining whether the second network node stores the first message further comprises an act of:

probabilistically determining whether the second network node stores the first message.

53. The at least one computer readable medium of claim 32, wherein the act of determining whether the first network node stores the second message further comprises an act of:

determining whether the first network node is capable of computing the second message.

54. The at least one computer readable medium of claim 32, wherein the method further comprises acts of:

receiving the encoded message at the first network node; and decoding the encoded message at the first network node using the second message to obtain the first message.

55. The at least one computer readable medium of claim 54, wherein the act of decoding the encoded message further comprises an act of:

XORing the encoded message and the second message.

56. The at least one computer readable medium of claim 54, wherein the method further comprises an act of:
adding the first message to a message pool on the first network node.

57. The at least one computer readable medium of claim 32, wherein the first message comprises at least a portion of a packet.

58. The at least one computer readable medium of claim 32, wherein the first message comprises at least a portion of a frame.

59. The at least one computer readable medium of claim 32, wherein the first message comprises at least a portion of a cell.

60. The at least one computer readable medium of claim 32, wherein the first message comprises a sequence of packets.

61. The at least one computer readable medium of claim 32, wherein the first message comprises a sequence of frames.

62. The at least one computer readable medium of claim 33, wherein the first message comprises a sequence of cells.

63. A sending network node configured for use in a network comprising a plurality of nodes including the sending network node, at least some of the plurality of nodes being coupled by a broadcast medium, wherein the sending network node has a queue of messages to be transmitted, the queue including a first message received from a first previous hop and a second message received from a second previous hop, and wherein the sending network node comprises:
at least one output; and
at least one controller, coupled to the output, that:
identifies the first message to be transmitted to a first destination node via a first network node;
identifies the second message to be transmitted from to a second destination node via a second network node, wherein the second network node is not the first previous hop; determines whether the first network node stores the second message;
determines whether the second network node stores the first message;
if it is determined that the first network node stores the second message and the second network node stores the first message, codes together the first and second messages to generate an encoded message; and
transmits the encoded message, via the output, over the broadcast medium.

64. The sending network node of claim 63, wherein the at least one controller:
identifies a third message in the queue to be transmitted from the sending network node to a third destination node via a third network node;
determines whether the first and second network nodes store the third message;
determines whether the third network node stores the first and second messages; and
when it is determined that the first and second network nodes store the third message and the third network node stores the first and second messages, codes together the first, second, and third messages to generate the encoded message.

65. The sending network node of claim 63, wherein the network is a wireless network and the broadcast medium is air.

66. The sending network node of claim 63, wherein the broadcast medium includes at least one network cable.

67. The sending network node of claim 63, wherein each of the plurality of nodes is a processor in a parallel computer and the broadcast medium includes at least one communication bus.

68. The sending network node of claim 63, wherein the first destination node and the first network node are different nodes.

69. The sending network node of claim 63, wherein the first destination node and the first network node are the same node.

70. The a sending network node of claim 63, wherein the second destination node and the second network node are different nodes.

71. The sending network node of claim 63, wherein the second destination node and the second network node are the same node.

72. The sending network node of claim 63, wherein the first and second destination nodes are different nodes.

73. The sending network node of claim 63, wherein the first and second destination nodes are the same node.

74. The sending network node of claim 63, wherein the first and second network nodes are different nodes.

75. The sending network node of claim 63, wherein the at least one controller generates the encoded message by XOR-ing the first and second messages to generate the encoded message.

76. The sending network node of claim 63, wherein the at least one controller generates the encoded message by computing linear combinations of the first and second messages over a finite field to generate the encoded message.

77. The sending network node of claim 63, wherein the at least one controller: schedules a retransmission of the first message to occur if an acknowledgment of receipt of the first message by the first network node is not received within a predetermined period of time.

78. The sending network node of claim 63, wherein the at least one controller:
schedules a retransmission of the second message to occur if an acknowledgment of receipt of the second message by the second network node is not received within a predetermined period of time.

79. The sending network node of claim 63, wherein the at least one controller:
maintains a message pool in which messages received over the network are temporarily stored; and
includes in the encoded message a reception report that identifies at least a portion of the messages stored in the message pool.

80. The sending network node of claim 63, wherein the at least one controller determines whether the first network node stores the second message using a reception report received from the first network node that identifies at least some of the messages stored by the first network node.

81. The sending network node of claim 63, wherein the at least one controller determines whether the first network node stores the second message using a reception report received from the first network node that identifies at least some of the messages stored by the first network node.

82. The sending network node of claim 63, wherein the at least one controller probabilistically determines whether the first network node stores the second message.

83. The sending network node of claim 63, wherein the at least one controller probabilistically determines whether the second network node stores the first message.

84. The sending network node of claim 63, wherein the at least one controller determines whether the first network node stores the second message by determining whether the first network node is capable of computing the second message.

85. The sending network node of claim 63, wherein the first message comprises at least a portion of a packet.

86. The sending network node of claim 63, wherein the first message comprises at least a portion of a frame.

87. The sending network node of claim 63, wherein the first message comprises at least a portion of a cell.

88. The sending network node of claim 63, wherein the first message comprises a sequence of packets.

89. The sending network node of claim 63, wherein the first message comprises a sequence of frames.

90. The sending network node of claim 63, wherein the first message comprises a sequence of cells.

91. A method of transmitting data in a parallel computer comprising a plurality of processors including a sending processor, at least some of the plurality of processors being coupled by a communication bus, wherein the method comprises acts of:
   identifying a first message to be transmitted from the sending processor to a first destination processor in the plurality of processors;
   identifying a second message to be transmitted from the sending processor to a second destination processor in the plurality of processors;
   determining whether the first destination processor stores the second message;
   determining whether the second destination processor stores the first message;
   if it is determined that the first destination processor stores the second message and the second destination processor stores the first message, coding together the first and second messages to generate an encoded message; and
   transmitting the encoded message over the communication bus.

92. A method of processing data at a receiving network node, the data being transmitted from a sending network node to the receiving network node over a network comprising a plurality of nodes including the receiving network node and the sending network node, at least some of the plurality of nodes being coupled by a broadcast medium, wherein the method comprises acts of:
   receiving, at the receiving network node, a first message from the sending network node, wherein an intended destination of the first message is a node different from the receiving network node, and wherein the first message includes information identifying messages stored by the sending network node;
   using the information to determine, at the receiving network node, whether the sending network node stores a second message;
   if it is determined that the sending network node stores the second message, coding together, at the receiving network node, the second message and at least one message not stored by the sending network node to generate an encoded message; and
   sending the encoded message to the sending network node.

93. A method of processing data at a receiving network node, the data being transmitted from a sending network node to the receiving network node over a network comprising a plurality of nodes including the receiving node and the sending node, at least some of the plurality of nodes being coupled by a broadcast medium, wherein the method comprises acts of:
   receiving, at the receiving network node, a first message from the sending network node, wherein an intended destination of the first message is a node different from the receiving network node;
   storing the first message at the receiving network node;
   receiving, at the receiving network node, an encoded message, wherein the receiving network node is an intended destination of the encoded message; and
   using the first message to decode the encoded message to obtain a second message.

* * * * *